United States Patent [19]

Belinkoff

[11] 4,147,925
[45] Apr. 3, 1979

[54] PERCOLATOR PARTITION PLATE HEATER ASSEMBLY

[75] Inventor: Irving R. Belinkoff, Queens Village, N.Y.

[73] Assignee: Kidde Consumer Durables Corp., Bala Cynwyd, Pa.

[21] Appl. No.: 900,361

[22] Filed: Apr. 26, 1978

[51] Int. Cl.² ............... H05B 3/06; F27D 11/02
[52] U.S. Cl. ..................... 219/530; 99/281; 219/430; 219/439; 219/441; 219/462; 219/540
[58] Field of Search ............ 219/430, 432, 433, 435, 219/436, 439, 441, 442, 462, 461, 530, 540; 99/280, 281–285, 310

[56] References Cited

U.S. PATENT DOCUMENTS

| 2,576,432 | 11/1951 | Wilcox | 99/281 |
| 2,798,143 | 7/1957 | O'Brien | 219/441 |
| 2,817,743 | 12/1957 | Foster | 219/436 |
| 2,856,844 | 10/1958 | Price | 99/281 X |
| 2,857,502 | 10/1958 | Schwaneke et al. | 219/441 |
| 3,084,614 | 4/1963 | Blanding et al. | 99/285 |
| 3,129,318 | 4/1964 | Morrison | 99/310 X |
| 3,682,089 | 8/1972 | Unger et al. | 99/281 |
| 3,701,883 | 10/1972 | Tilp | 219/436 |
| 3,721,173 | 3/1973 | Logan | 99/280 |
| 3,725,641 | 4/1973 | Tilp | 219/433 |

Primary Examiner—Volodymyr Y. Mayewsky
Attorney, Agent, or Firm—Seidel, Gonda, Goldhammer & Panitch

[57] ABSTRACT

A percolator is provided with a preassembled partition plate heater assembly wherein a one-piece non-corrosive metal partition plate has a centrally located pump well. An annular heat distribution plate surrounds the well and is fixedly connected to a bottom surface of said plate. A main heater coil surrounds said well and is mechanically coupled to said heat distribution plate. An auxiliary heater coil is radially outwardly from said main heater coil and is mechanically coupled to said heat distribution plate. A thermostat is in direct contact with a bottom surface of said partition plate and is releasably supported by said heat distribution plate.

6 Claims, 4 Drawing Figures

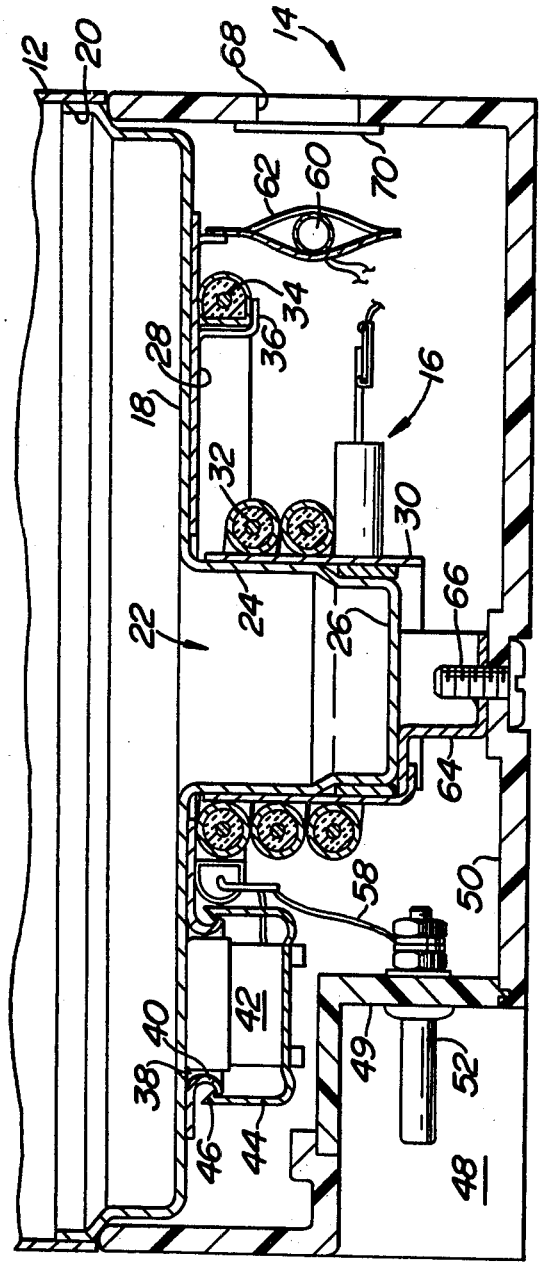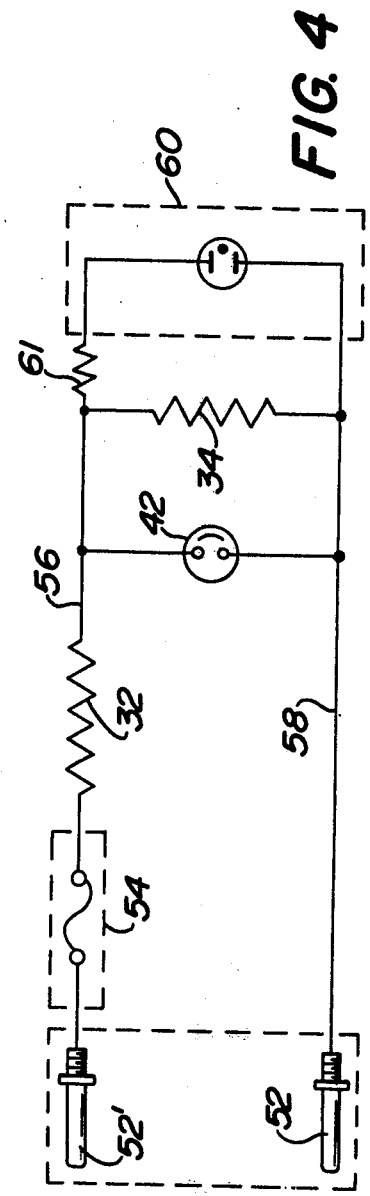

PERCOLATOR PARTITION PLATE HEATER ASSEMBLY

BACKGROUND

Percolators having partition plate heater assemblies are per se old. For representative prior art, see U.S. Pat. Nos. 2,817,743; 3,721,176 and 3,725,641.

Prior art devices of the type involved herein are designed in a manner so as to be objectionable for one or more of the following reasons: they are subject to leakage due to the use of a gasket or nut, there is insufficient heat transfer which results in localized hot spots which may discolor the partition plate, are an electrical hazard in that water leakage may enter the electrical area, the terminal pins are subject to carbon tracking and possible electrical breakdown, the thermostat does not have positive surface contact and is difficult to replace, etc. The present invention solves these problems while providing an assembly structurally interrelated in a manner so as to have additional advantages.

SUMMARY OF THE INVENTION

The invention is directed to a percolator and a partition plate heater assembly therefor. The assembly is comprised of a one-piece non-corrosive metal partition plate having a centrally located well and an axially extending periperal flange. An annular heat distribution plate is fixedly connected to and in direct contact with the bottom surface of said partition plate while having its inner periphery closely adjacent to the outer periphery of said well. The outer periphery of the heat distribution plate is spaced radially inwardly from the periphery of said partition plate.

The assembly includes a main heater coil which surrounds said well. The main heater coil has a portion which is thermally and mechanically coupled to said heat distribution plate. An auxiliary heater coil is provided radially outwardly from said main heater coil. The auxiliary heater coil is thermally and mechanically coupled to said heat distribution plate.

The assembly includes a thermostat in direct contact with a bottom surface of the partition plate. The heat distribution plate has a hole through which said thermostat extends for such contact with the bottom surface of said partition plate. A mounting means is provided and which cooperates with the heat distribution plate for maintaining the thermostat in direct contact with said bottom surface of the partition plate. The assembly also includes circuitry wherein the thermostat is in parallel with the auxiliary heater, while the thermostat and auxiliary heater are in series with the main heater coil.

It is an object of the present invention to provide a percolator with a novel partition plate heater assembly which overcomes the disadvantages or problems associated with the prior art.

It is another object of the present invention to provide a percolator partition heater assembly which is structurally interrelated in a manner so as to uniformly spread heat so as to prevent localized hot spots while elminating problems of water leakage, potential breakdown problems, which facilitate the ease of replacing thermostats, and while providing a reliable assembly which is easy to assemble and/or maintain.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3—3 in FIG. 2.

FIG. 4 is a diagrammatic wiring diagram for electrical circuitry.

Figure 1:
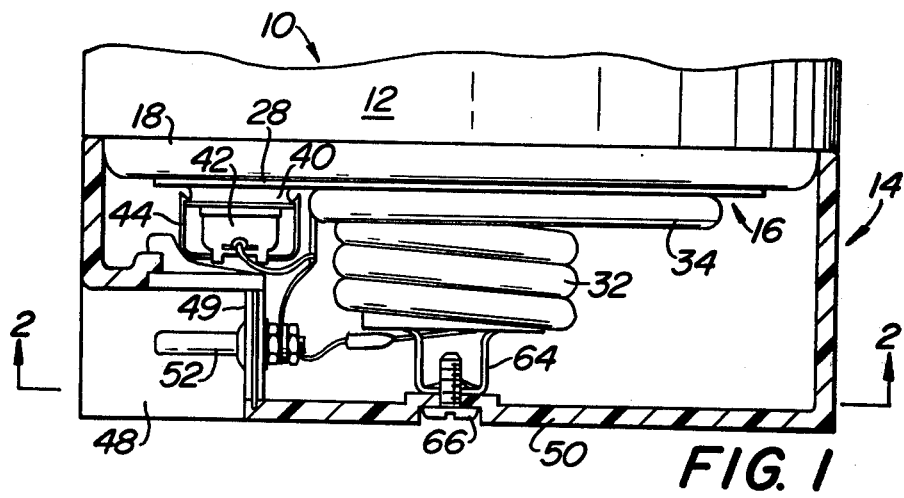
FIG. 1 is an elevation view of the lower portion of a percolator with the base shown in section.

Referring to the drawings in detail, wherein like numerals indicate like elements, there is shown a percolator designated generally as 10. The percolator 10 has a housing 12 supported by and connected to a base designated generally as 14. The interior of the base 14 is separated from the interior of the housing 12 by a partition plate assembly 16.

The partition plate assembly 16, as shown more clearly in FIG. 3, includes a partition plate 18 which is generally flat and integral with an axially extending centrally disposed pump well 22. At its periphery, the plate 18 is provided with an axially directed flange 20. Flange 20 is metallurgically bonded to the inner surface of the housing 12 in any convenient manner such as by welding, brazing, and the like. Plate 18 is an integral one-piece plate made from a non-corrosive metal such as stainless steel. One suitable material for plate 18 is stainless steel type 304 having a thickness of 0.032 inches. The upper surface of plate 18 is preferably a polished surface.

The well 22 is defined by a cylindrical wall 24 coaxial with the housing 12 and a bottom wall 26. Well 22 preferably has a diameter of about one inch and a depth of about one inch. A heat diffusion plate 28 is metallurgically bonded to the bottom surface of the plate 18 in any convenient manner such as by welding or brazing. Plate 28 is annular with its inner diameter being closely adjacent the well 22 and with its outer periphery spaced inwardly from the periphery of plate 18. Plate 28 is thereby fixedly connected to and in direct contact with the bottom surface of the partition plate 18. A suitable material for plate 28 is a cold rolled steel which has been corrosion protected and has a thickness of 0.042 inches.

Figure 2:
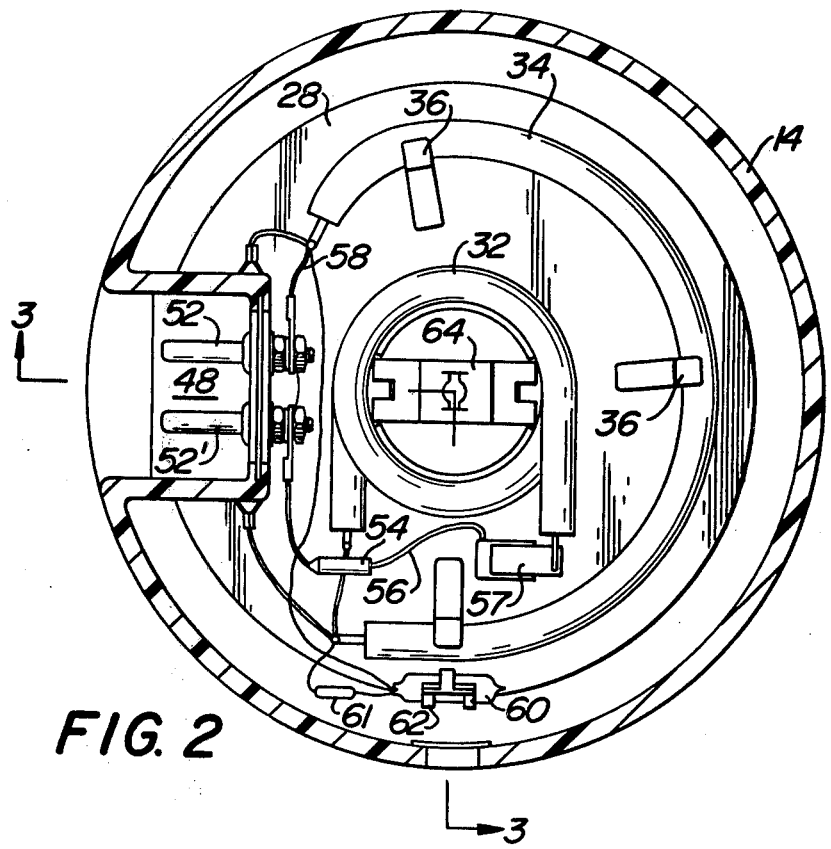
FIG. 2 is a sectional view taken along the line 2—2 in FIG. 1.

A ring 30 is brazed or otherwise secured to the outer periphery of the wall 24. A main heater coil 32 extends around and its metal jacket is brazed or otherwise metallurgically bonded to the ring 30. The metal jacket of the uppermost coil of the main heater 32 is brazed or otherwise secured to the inner peripheral portion of the heat diffusion plate 28. The ends of heater 32 are straight and parallel as shown in FIG. 2.

An auxiliary heater 34 is disposed radially outwardly from the main heater 32. The metal jacket of auxiliary heater 34 is thermally connected to the heat diffusion plate 28 by brazing or the like and is mechanically connected to plate 28 in any convenient manner such as by the prongs 36. Prongs 36 are struck from the heater plate 28 and bent so as to secure the heater 34 in a predetermined disposition. The auxiliary heater 34 is preferably C-shaped as shown in FIG. 2.

The heat diffusion plate 28 is provided with a hole 38 adjacent the periphery of plate 28. See FIG. 3. The material of plate 28 immediately adjacent the hole 38 is bent downwardly and curved to provide an annular lip 40. A normally closed thermostat 42 extends through the hole 38 so as to be in direct physical contact with the bottom surface of the partition plate 18. A retainer spring clip 44 biases the thermostat 42 into contact with the bottom surface of plate 18. Clip 44 is provided with jaws 46 which snap under the lip 40. Hence, in order to remove the thermostat 42 from contact with plate 18, it is only necessary to unsnap the jaws 46 of the spring clip 44.

The base 14 is preferably molded in the form of a cylinder with an integral bottom wall, an open top, and a recess 48 on its periphery. A terminal mount 49 of electrical insulating material forms the back wall and part of the top wall of the recess 48. The recess 48 is open at its bottom. The lower edge of the mount 49 is secured to the bottom wall 50 of the base 14.

The mount 49 supports terminals 52 and 52' which project into the recess 48 and to which an electric cord may be wrappedly connected. As shown more clearly in FIG. 4, the terminals 52, 52' are part of electrical circuitry. Terminal 52' is connected by way of a fuse 54, conductor 56, and a quick disconnect terminal 57 to the main heater 32. Terminal 52 is connected to conductor 58. The thermostat 42 is connected across the conductors 56, 58 by way of quick connect terminals. The auxiliary heater 34 is connected across the conductors 56, 58 in parallel with the thermostat 42. Each of the thermostat 42 and auxiliary heater 34 are in series with the main heater 32.

A lamp 60 is connected across conductors 56, 58 in parallel with the auxiliary heater 34. Lamp 60 and resistor 61 are in series. When using a 1000 watt main heater 32 and a 50 watt auxiliary heater 34, resistor 61 may be a 30 K resistor. Lamp 60 is preferably a neon lamp.

The heat diffusion plate 28 is provided with a bent-down flange to which is attached a bracket 62. The bracket 62 supports the lamp 60 adjacent a window 68 in the base 14. A red lens or comparable device overlies the window 68 on the inner surface of the base 14.

A bracket 64 which is generally U-shaped is secured to the bottom wall 26 of the well 22 by a bent-over flange on the ring 30. The bight portion of the bracket 64 cooperates with a retainer 66 to join the base 14 to the partition plate assembly 16. Fastener 66 is preferably a threaded fastener or some other easily removable retainer.

In use, the main heater 32 heats the liquid within the housing 12 by concentrating its heat in well 22 and from which the liquid is pumped. When the thermostat 42 opens, the liquid is maintained at the desired temperature by the combination of heaters 32, 34 while at the same time the lamp 60 is lit to indicate that the liquid is at the desired temperature. Localized hot spots for substantially the entirety of partition plate 18 are avoided by the presence of the diffusion plate 28. The diffusion plate 28 is thermally and mechanically coupled to each of the main heater 32 and auxiliary heater 34 while at the same time constitutes means for supporting the thermostat 42 and the lamp 60. Thus, the heater plate 34 performs a multitude of functions. Access to the interior of base 14 is attained by removal of the fastener 66 whereby the entirety of the circuitry is exposed as will be apparent from FIG. 2. The thermostat 42 is in direct physical contact with the bottom surface of plate 18 and may be rapidly replaced by removing the clip 44 and disconnecting the quick connect terminals across conductors 56, 58.

The assembly 16 is preferably pre-assembled as a unit and then metallurgically bonded to the housing 12. Thereafter, the preformed base 14 is connected to the assembly 16 by fastener 66. Thus, assembly of the percolator 10 is materially simplified.

The present invention may be embodied in other specific forms without departing from the spirit or essential attributes thereof and, accordingly, reference should be made to the appended claims, rather than to the foregoing specification as indicating the scope of the invention.

I claim:

1. A percolator partition plate heater assembly comprising:
    (a) a one-piece non-corrosive metal partition plate having a centrally located well and an axially extending peripheral flange,
    (b) an annular heat distribution plate having its inner periphery closely adjacent to the outer periphery of said well, the outer periphery of said heat distribution plate being spaced radially inwardly from the periphery of said partition plate, said heat distribution plate being fixedly connected to and in direct contact with the bottom surface of said partition plate,
    (c) a main heater coil surrounding said well, said main heater coil having a portion thereof thermally and mechanically coupled to said heat distribution plate,
    (d) an auxiliary heater radially outwardly from said main heater coil, said auxiliary heater being thermally and mechanically coupled to said heat distribution plate,
    (e) a thermostat in direct contact with a bottom surface of said partition plate, said heat distribution plate having a hole through which said thermostat extends, mounting means cooperating with said heat distribution plate for maintaining said thermostat in direct contact with said surface of said partition plate, and
    (f) circuitry including said thermostat in parallel with said auxiliary heater, and said thermostat and auxiliary heater being in series with said main heater coil.

2. Apparatus in accordance with claim 1 wherein said circuitry includes a lamp, a bracket connected to said heat diffusion plate for supporting said lamp adjacent the periphery of said heat diffusion plate.

3. Apparatus in accordance with claim 1 wherein said mounting means for said thermostat includes a spring clip connected to a portion of said heat diffusion plate.

4. Apparatus in accordance with claim 3 wherein said portion of said heat diffusion plate is a curved lip adjacent the periphery of said hole through which said thermostat extends.

5. Apparatus in accordance with claim 1 wherein the terminal end portions of said main heater coil are parallel with at least one terminal end of said main heater coil being coupled to the circuitry by a quick disconnect terminal.

6. Apparatus in accordance with claim 1 including a ring surrounding said well and metallurgically bonded thereto, said main heater coil surrounding said ring and being metallurgically bonded thereto.

* * * * *